(12) United States Patent
Warren (10) Patent No.: US 7,281,809 B2
(45) Date of Patent: Oct. 16, 2007

(54) OPEN LATTICE MIRROR STRUCTURE AND METHOD OF MAKING SAME

(75) Inventor: Peter A. Warren, Newton, MA (US)

(73) Assignee: Foster Miller, Inc., Waltham, MA (US)

( * ) Notice: Subject to any disclaimer, the term of this patent is extended or adjusted under 35 U.S.C. 154(b) by 0 days.

(21) Appl. No.: 11/284,499

(22) Filed: Nov. 21, 2005

(65) Prior Publication Data
US 2006/0181794 A1 Aug. 17, 2006

Related U.S. Application Data

(62) Division of application No. 10/335,512, filed on Dec. 31, 2002, now abandoned.

(51) Int. Cl.
*G02B 5/08* (2006.01)
*G02B 7/182* (2006.01)
(52) U.S. Cl. ............... 359/848; 359/883; 359/900; 65/36; 65/61; 156/153; 451/41
(58) Field of Classification Search .......... 359/848, 359/871, 883, 900; 65/36, 61; 156/153; 451/41
See application file for complete search history.

(56) References Cited

U.S. PATENT DOCUMENTS

| | | | |
|---|---|---|---|
| 3,507,737 A | 4/1970 | Busdiecker et al. | |
| 3,600,257 A | 8/1971 | Reinhardt | |
| 3,644,022 A | 2/1972 | Jagdt et al. | |
| 3,754,812 A | 8/1973 | Mohn | |
| 3,912,380 A | 10/1975 | Klein | |
| 4,264,146 A | 4/1981 | Sutton | |
| 4,331,383 A | 5/1982 | Christiansen | |
| 4,433,045 A | 2/1984 | Gowan et al. | |
| 4,443,059 A | 4/1984 | Wells | |
| 4,447,130 A | 5/1984 | Christiansen et al. | |
| 4,451,119 A | 5/1984 | Meyers et al. | |
| 4,466,700 A | 8/1984 | Christiansen et al. | |
| 4,575,029 A | 3/1986 | Harwood et al. | |
| 4,670,338 A | 6/1987 | Clemino | |
| 4,692,367 A | 9/1987 | Richter | |
| 4,772,111 A | 9/1988 | Shimura et al. | |
| 4,822,156 A * | 4/1989 | Hugenell ................ 359/853 |
| 4,898,604 A | 2/1990 | Sauerwein | |
| 4,917,934 A | 4/1990 | Sempolinski | |
| 4,927,257 A * | 5/1990 | Enterline et al. ........ 359/871 |
| 5,058,993 A | 10/1991 | Wakugawa | |

(Continued)

FOREIGN PATENT DOCUMENTS

WO WO93/09068 5/1993

OTHER PUBLICATIONS

Perrygo; "Inflatable truss support structures for future large space telescopes"; Utra lightweight Space Optics Challenge Workshop; Mar. 1999; pp. 1-26.*

*Primary Examiner*—Ricky D. Shafer
(74) *Attorney, Agent, or Firm*—Iandiorio & Teska (57) ABSTRACT

A method of making a mirror structure includes assembling a supporting isogrid framework, assembling an isogrid back plane, interconnecting the supporting isogrid framework with the isogrid back plane by a truss core, and disposing an optical surface on the supporting isogrid framework.

8 Claims, 7 Drawing Sheets

U.S. PATENT DOCUMENTS

| | | |
|---|---|---|
| 5,076,700 A | 12/1991 | DeCaprio |
| 5,428,483 A | 6/1995 | Sato et al. |
| 5,487,930 A * | 1/1996 | Lockshaw et al. ............ 428/53 |
| 5,554,430 A | 9/1996 | Pollatta et al. |
| 5,565,052 A | 10/1996 | Papenburg et al. |
| 5,593,752 A | 1/1997 | Pollatta et al. |
| 5,760,979 A * | 6/1998 | Saito .......................... 359/859 |
| 5,825,565 A | 10/1998 | Papenburg et al. |
| 6,007,894 A * | 12/1999 | Barnes et al. ............... 428/120 |
| 6,045,231 A | 4/2000 | Martineau |
| 6,064,352 A * | 5/2000 | Silverman et al. .......... 343/912 |
| 6,286,289 B1 * | 9/2001 | Powell et al. .............. 52/790.1 |

* cited by examiner

OPEN LATTICE MIRROR STRUCTURE AND METHOD OF MAKING SAME

RELATED APPLICATIONS AND PRIORITY CLAIM

This application is a divisional application of prior U.S. patent application Ser. No. 10/335,512 filed Dec. 31, 2002 now abandoned, which is hereby incorporated herein by reference, and to which this application claims priority.

GOVERNMENT RIGHTS

This invention was made with U.S. Government support under Contract No. F29601-02-C-0149 awarded by the U.S. Airforce. The Government may have certain rights in the subject invention.

FIELD OF THE INVENTION

This invention relates to a mirror supporting or back structure which offers significant benefits over honeycomb core back structures.

BACKGROUND OF THE INVENTION

In the prior art, mirrors used, for example, in large ground based and spaced based telescopes, include a honeycomb core disposed between the mirror surface and a backing plate. See U.S. Pat. Nos. 4,331,383; 6,045,231; 5,076,700; 4,447,130; 3,754,812; 4,917,934; 3,507,737; 3,644,022; 4,466,700; and 4,692,367 incorporated herein by this reference.

The honeycomb core supports the mirror and is light weight—an important feature for the back structure of the mirror since the mirror and the rest of the components of the telescope are repositioned by various motors. Especially in space-based applications, it is critical that all of the components of the telescope be as lightweight as possible since the maneuvering motors associated with the telescope and spacecraft have limited power available and because the telescope itself must be transported via the space shuttle or a rocket.

But, as the glass reflecting surface is made thinner and thinner to reduce its mass, the local bending stiffness is reduced at a rate of proportional to the cube of the thickness. As the glass bending stiffness is reduced, the honeycomb support must be placed closer and closer together to prevent the reflecting surface from vibrating or sagging too much. As the density of the support locations increases, so does the mass of the supporting honeycomb structure. Thus, there is a limit to how lightweight a honeycomb core mirror can become without significantly losing stiffness and thus performance.

In addition, polishing a mirror supported by a honeycomb core back structure is problematic and may result in quilting as the polishing tool deforms the honeycomb walls and the mirror offers less resistance to the polishing tool in the areas between the honeycomb walls. As a result, more mirror material is removed at the boundaries of the mirror and the honeycomb cell walls than between the honeycomb cell walls.

SUMMARY OF THE INVENTION

It is therefore an object of this invention to provide a truss type back structure for a mirror which offers significant benefits over honeycomb core back structures.

It is a further object of this invention to provide an open lattice mirror back structure instead of a honeycomb core back structure.

It is a further object of this invention to provide such an open lattice mirror back structure which better supports even very thin mirrors.

It is a further object of this invention to provide such an open lattice mirror back structure which is lightweight.

It is a further object of this invention to provide such an open lattice mirror back structure which enables designers to select from several different architectural options.

It is a further object of this invention to provide a method of making an open lattice mirror back structure.

It is a further object of this invention to provide a method of polishing a mirror which reduces or eliminates quilting and also increases processing speed.

This invention results from the realization that a better mirror back structure is effected by an isogrid framework supporting a mirror face sheet, an isogrid back plane, and a truss core interconnecting the supporting isogrid framework and the isogrid back plane for transferring shear loads evenly between the face sheet and the isogrid back plane.

In this way, the mirror back structure is an open lattice type structure the cells of which can be made smaller and smaller to support thinner and thinner mirrors not by adding honeycomb cell walls but instead by adding additional thin isogrid members. In addition, since the back structure is an open lattice configuration, it can be filled with a removable substance which supports the mirror during polishing operations to prevent quilting.

This invention features, in one embodiment, an open lattice mirror structure comprising an optical face sheet, a supporting isogrid framework supporting the optical face sheet, an isogrid back plane, and a truss core interconnecting the supporting isogrid framework and the isogrid back plane for transferring shear loads evenly between the face sheet and the isogrid back plane.

Typically, the supporting isogrid framework, the isogrid back plane, and the truss core are formed from composite members including lengthy carbon fibers encapsulated in a resin matrix. The fibers may be arranged in bundles, arranged in an array to produce flat members, or disposed in layers consolidated together.

Typically, the core includes members extending at an angle from the back plane to the supporting framework and members extending perpendicularly between the back plane and the supporting framework.

In one example, the supporting isogrid framework includes six sides and spaced members extending between the sides intersecting to form isosceles triangles. Similarly, the isogrid back plane also includes six sides and spaced members extending between the sides intersecting to form isosceles triangles. The optical face sheet may form a convex, concave, or planar mirror.

One method of making a mirror structure in accordance with this invention includes assembling a supporting isogrid framework, assembling an isogrid back plane, interconnecting the supporting isogrid framework with the isogrid back plane by a truss core, and disposing an optical surface on the supporting isogrid framework.

The method may further include polishing the optical surface by filling the truss core with a removable substance, grinding the optical surface, and removing the removable substance. Typically, the removable substance includes particles such as glass, fused silica, sand, and granite material. Also, the particles may be mixed with a binder material such as waxes, gypsum, epoxies, and adhesives. In one example, the optical surface is turned upside down, the removable substance is poured into the truss core through the isogrid back plane, and cured. The removable substance may removed by melting, dissolving, degaussing, and vibration techniques. The method may further include the step of figuring the optical surface after the substance is removed.

Thus, this invention also features a method of polishing an optical surface supported by a back structure, the method comprising filling the back structure with a removable substance, grinding the optical surface, and removing the removable substance. Preferably, the back structure has an open lattice configuration.

One open lattice optical back structure in accordance with this invention includes an optical face sheet, a back plane, and a truss core between the back plane and the optical face sheet for transferring shear loads to the back plane. Preferably, there is also a supporting isogrid structure between the optical face sheet and the truss core.

Another open lattice optical back structure featured herein has a supporting isogrid framework supporting an optical face sheet, a back plane, and a core interconnecting the supporting isogrid framework and the back plane for transferring shear loads to the isogrid back plane. Preferably, the core is a truss structure and the back plane is an isogrid structure.

Still another open lattice optical back structure in accordance with this invention includes an optical face sheet, an isogrid back plane, and a core between the optical face sheet and the isogrid back plane for transferring shear loads to the isogrid back plane. Preferably, there is an isogrid framework supporting structure between the core and the optical face sheet.

Still another possible open lattice optical back structure includes a supporting isogrid framework which supports an optical face sheet, an isogrid back plane, and a core interconnecting the supporting isogrid framework and the isogrid back plane for transferring shear loads to the isogrid back plane.

BRIEF DESCRIPTION OF THE DRAWINGS

Other objects, features and advantages will occur to those skilled in the art from the following description of a preferred embodiment and the accompanying drawings, in which:

FIGS. 16A-16H are schematic cross sectional view showing the primary steps associated with manufacturing a mirror system in accordance with the method of the subject invention.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
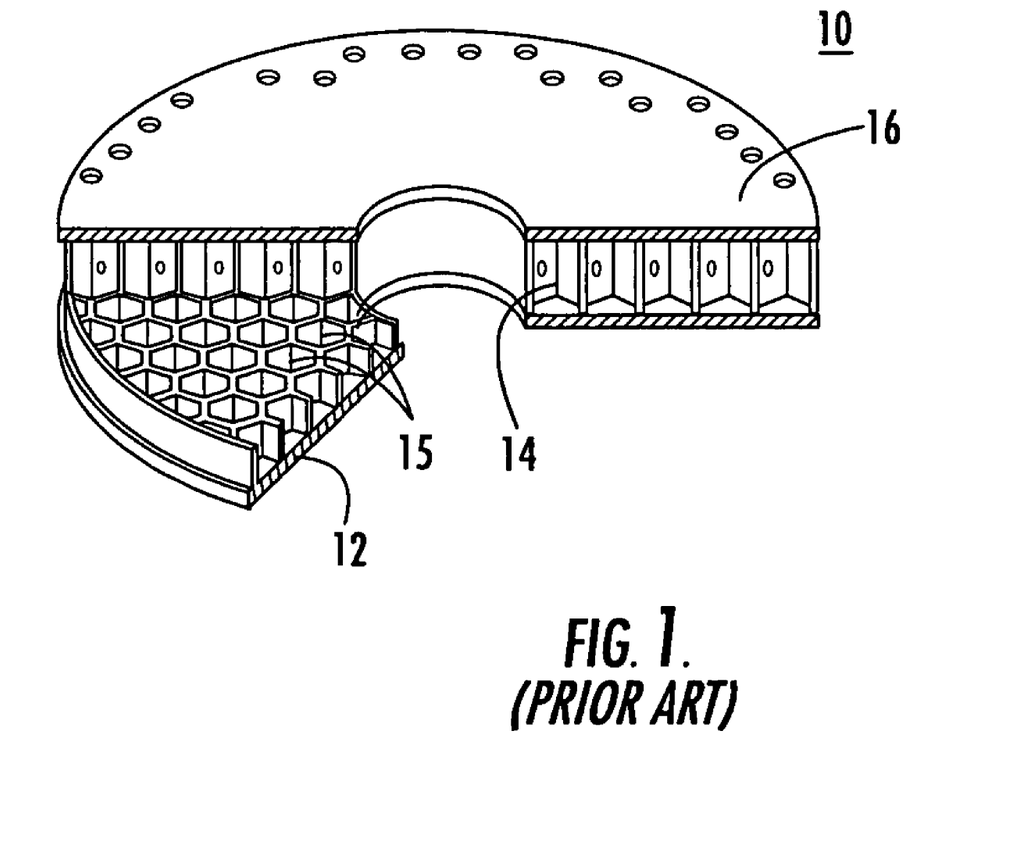
FIG. 1 is a schematic partial three dimensional view of a prior art mirror structure.

FIG. 1 shows prior art mirror structure 10 including optical face sheet 12, honeycomb core 14, and back plane 16. See U.S. Pat. No. 3,644,022 incorporated herein by this reference. As discussed in the background section above, as glass mirror 16 is made thinner, the honeycomb cells 15 supporting mirror 16 must be made smaller and smaller. Unfortunately there is a limit to how small the honeycomb cells can be made. Moreover, as the honeycomb cells are made smaller, additional honeycomb cell walls must be added increasing the weight of the honeycomb core back structure. In addition, polishing mirror 16 supported by honeycomb back structure is problematic and may result in quilting as the polishing tool deforms the honeycomb walls and the mirror offer less resistance to the polishing tools in the areas between the honeycomb walls. As a result, more mirror material is removed at the boundaries of the mirror and the honeycomb cell walls than between the honeycomb cell walls.

Figure 2:
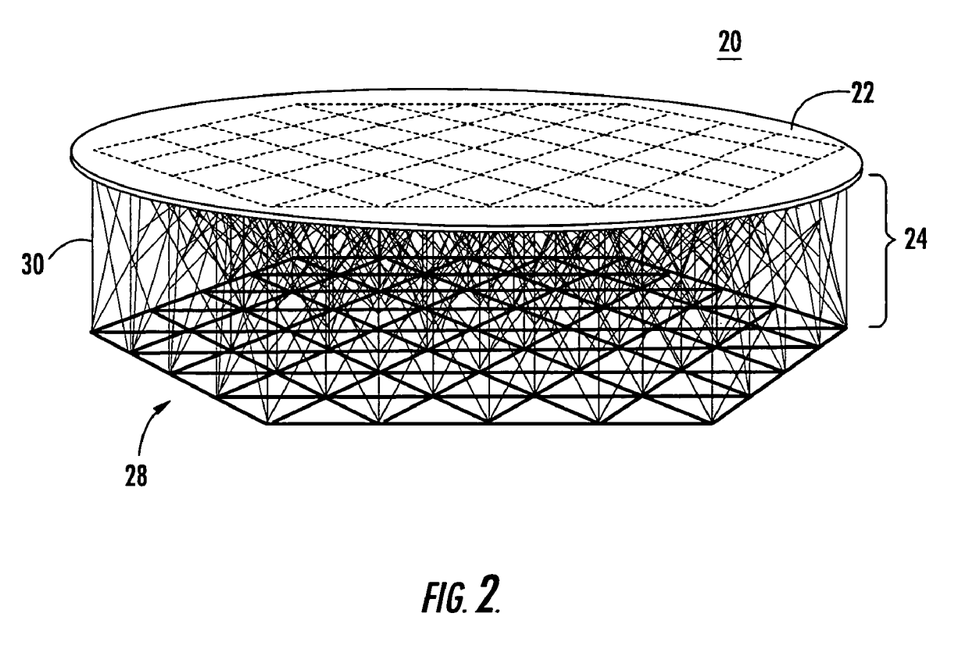
FIG. 2 is a schematic three dimensional top view of the mirror structure of the subject invention.
Figure 3:
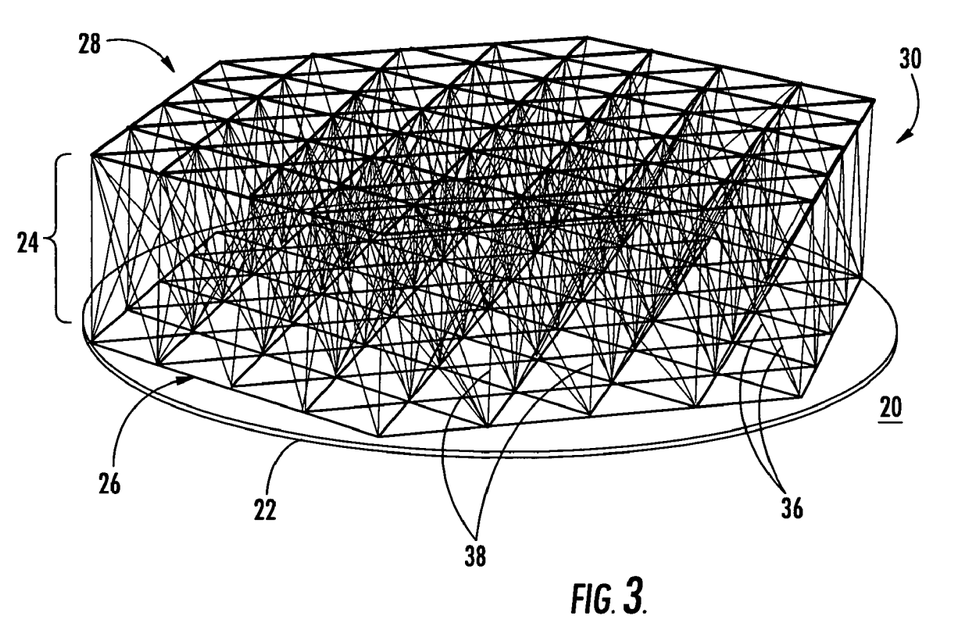
FIG. 3 is a schematic three dimensional bottom view of the mirror structure of the subject invention.

Open lattice mirror structure 20, FIGS. 2-3, in contrast, offers significant benefits over honeycomb core structure 10, FIG. 1; Structure, FIG. 2 includes optical face sheet 22, typically a convex, concave, or planar mirror ten inches to thirty meters in diameter supported by open-lattice (e.g., three-eight inch thick) optical back structure 24, which, in one embodiment, includes supporting isogrid framework 26 best seen in FIG. 3, isogrid back plane 28 and truss core 30 interconnecting supporting isogrid framework 26 and isogrid back plane 28 for transferring shear loads evenly between optical face sheet 22 and isogrid back plane 28.

Figure 4:
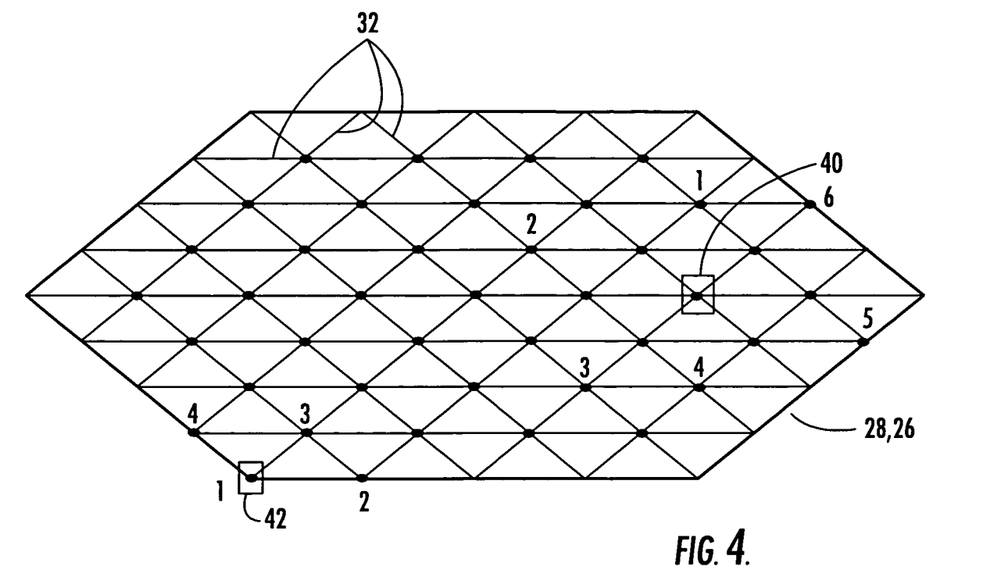
FIG. 4 is a plan view showing one example of the supporting isogrid framework and the isogrid back structure construction in accordance with the subject invention.

In one example, both supporting isogrid framework 26 and isogrid back plane 28, FIG. 4 are six sided structures with spaced members 32 extending between the sides thereof and intersecting to form isosceles triangles as shown. The particular truss core structure shown in FIGS. 2-3 include members extending at an angle from back plane 28 to supporting framework 26 such as members 36, FIG. 3 and also select members, typically at the boundary areas, extending perpendicularly between back plane 28 and supporting framework 26 such as members 38 shown in FIG. 3. Thus, if internal node 40, FIG. 4 is considered to be a node of back plane 28, six truss members may originate at node 28 and each angled differently to nodes 1-6 of supporting framework 26. At boundary node 42, in contrast, four truss members originate and one extends perpendicularly to the same node of the supporting framework 26 and three truss members extend at different angles to nodes 2-4 of supporting framework 26. The ends of each truss member are secured to the respective nodes of the back plane and the supporting framework by an adhesive, for example. Construction of the design shown in FIGS. 2-3 was performed manually but automatic or semi-automatic processes may also be used.

Figure 5:
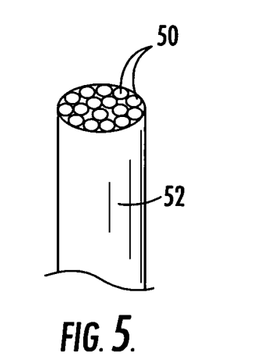
FIG. 5 is a schematic three dimensional view showing a typical truss member in accordance with the subject invention.
Figure 6:
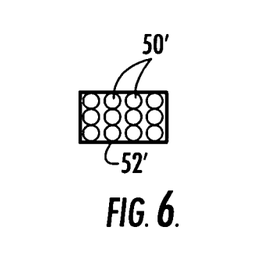
FIG. 6 is a cross-sectional view showing the construction of a typical back plane member in accordance with the subject invention.
Figure 7:
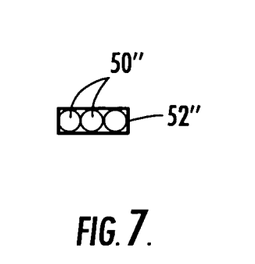
FIG. 7 is a cross sectional view of a typical supporting isogrid member in accordance with the subject invention.
Figure 8:
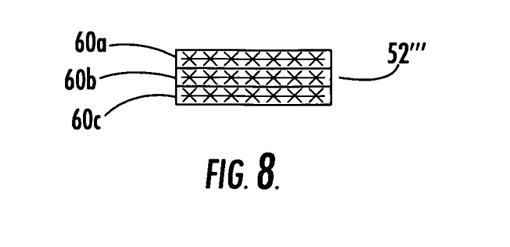
FIG. 8 is a schematic cross sectional view showing another member useful as a truss member, back plane member, and/or supporting isogrid structural member in accordance with the subject invention.

In the embodiment of FIGS. 2-3, the composite truss members of the core include lengthy carbon fibers 50, FIG. 5 arranged in bundle 52 and encapsulated in a resin matrix. The resin material chosen is preferably low moisture expansion material. See U.S. Pat. Nos. 5,554,430 and 5,593,752 incorporated herein by this reference. The composite members of the isogrid back plane, in turn, include carbon fibers 50', FIG. 6 arranged in a three by three array and encapsulated in a resin matrix to form flat member 52'. The composite members of the supporting isogrid framework also include carbon fibers 50", FIG. 7 but arranged in a one by three matrix and encapsulated in a resin material to form flat member 52". In another embodiment, however, member 52''', FIG. 8, useful for the truss core, the isogrid back plane, and/or the supporting isogrid framework, includes plies 60a-c including fibers oriented axially, longitudinally, and/or biased in a resin matrix to consolidate the plies together.

Figure 9:
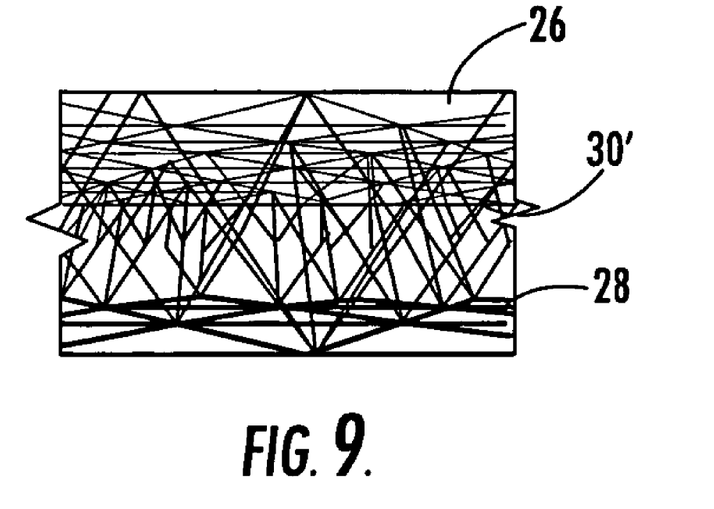
FIGS. 9-13 are schematic views showing additional possible open lattice back structure configurations in accordance with the subject invention.
Figure 10:
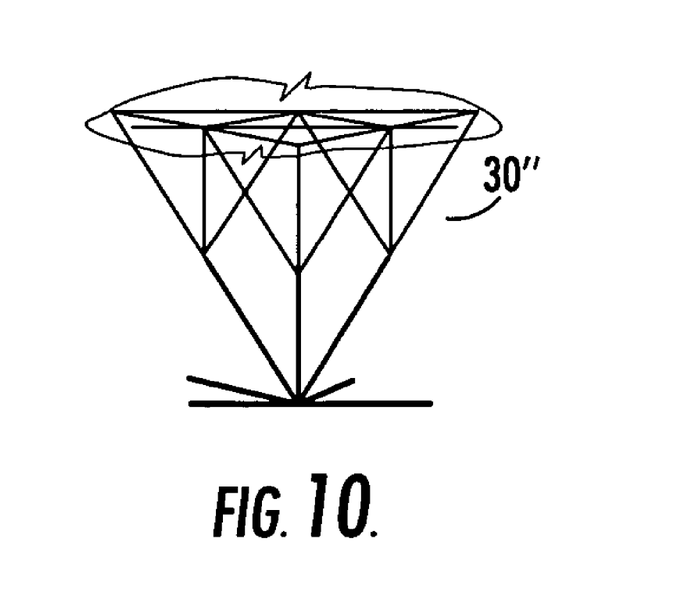
Figure 11:
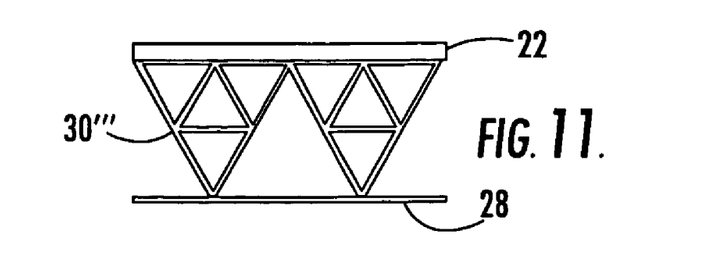
Figure 12:
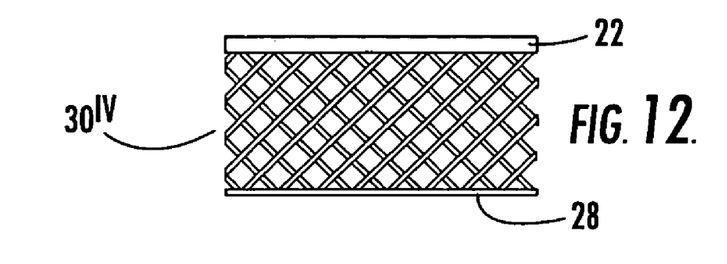
Figure 13:
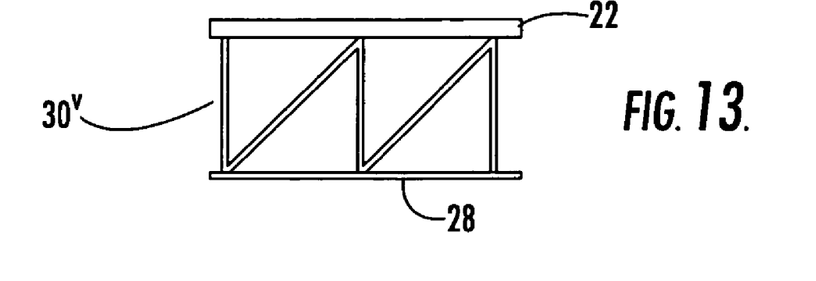

And, the particular construction of truss core 30, FIGS. 2-3 is not a limitation of the subject invention. FIG. 9 shows truss core 30' between back plane 28 and supporting structure 26; FIG. 10 shows alternate truss core 30"; FIG. 11 shows another truss core 30''', FIG. 12 shows truss core $30^{IV}$, and FIG. 13 shows truss core $30^{V}$. Thus, designers are able to select from several different architectural options when designing an optical back structure in accordance with this invention.

Figure 14A:
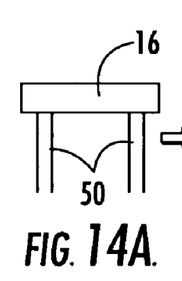
FIGS. 14A-14D are schematic cross sectional view depicting the primary steps associated with polishing an optical mirror and the resulting quilting that occurs in accordance with the prior art.
Figure 14B:
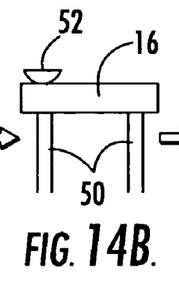
Figures 14C, 14D:
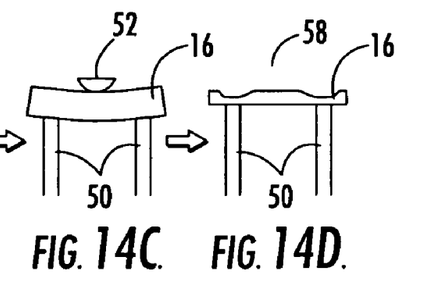

As stated above, another feature of the optical back structure of the subject invention is the ability to polish the mirror without quilting. In the prior art, honeycomb walls 50, FIG. 14A supporting glass face sheet 16 adequately support polishing tool 52, FIG. 14B when it is located directly over a wall as shown in FIG. 14B but, between the walls, as shown in FIG. 14C, the glass bends downward due to the force applied by polishing tool 52 resulting in less material being removed between the walls than at the wall/glass interface resulting in quilting as shown at 58 in FIG. 14D.

Figure 15A:
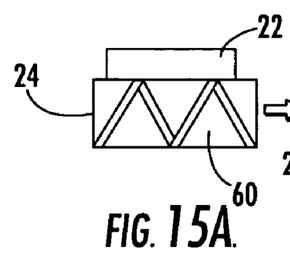
FIGS. 15A-15C are schematic cross sectional view showing how quilting is eliminated or reduced when the polishing method of the subject invention is employed.
Figures 15B, 15C:
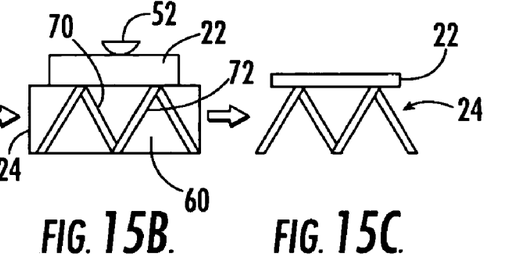

In the subject invention, in contrast, back structure 24, FIG. 15A can be filled with removable substance 60 prior to polishing as shown in FIG. 15B to support optical mirror 22 and to prevent quilting between truss members 70 and 72. The removable substance also supports the mirror during handling or transportation thereof. After polishing, this removable substance is removed as shown in FIG. 15C. In one example, removable substance includes particles (e.g., glass, fused silica, sand, or granite materials) typically but not necessarily mixed with a binder material (e.g., wax, gypsum, epoxies, or an adhesive, for example). Removal techniques include melting, dissolving, degaussing, and vibration techniques depending on the selected particles and optional binder material. Thus, if sand and a water based adhesive are used, dissolving with water, alcohol or another solvent such as acetone may be the desired technique. But, if interlocking particles are used alone, magnetic degaussing or vibratory techniques may be preferred. And, the particles can be round, sharp-edged, or interlocking. In any case, it is preferred that the chosen material combinations conform to match the surface contours of the mirror, is easy to dispose through the back structure of the mirror, is easy to remove, and is stable while in place.

Figures 16A, 16B:
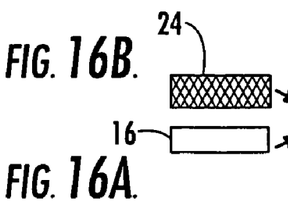
Figure 16C:
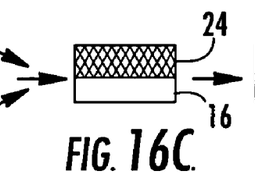
Figure 16D:
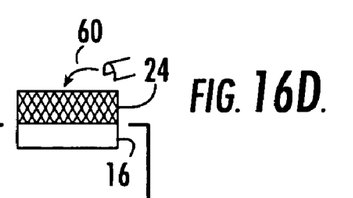
Figures 16E, 16F:
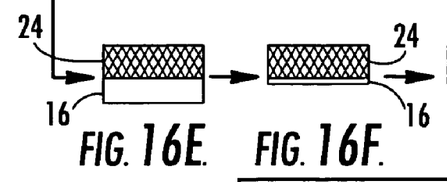

FIG. 16A-16H depict an exemplary method of making a mirror structure in accordance with this invention. Glass layer 16 is poured and cured, FIG. 16A as is conventional. Back structure 24 is also fabricated, FIG. 16B as discussed above with reference to FIGS. 2-3. After glass layer 16 is bonded to back structure 24, back structure 16 is filled with a removable substance and cured, FIG. 16E whereupon grinding operations take place, FIG. 16F as discussed above with reference to FIGS. 15A-15C. In FIG. 16G supporting removable substance 60 is washed out whereupon ion figuring takes place, FIG. 16H.

In this way, quilting is reduced or eliminated and better mirror back structure is effected by a truss core interconnecting a supporting isogrid framework and an isogrid back plane for transferring shear loads evenly between the optical face sheet and the isogrid back plane. Because the mirror back structure is an open-lattice type structure, the cells thereof can be made smaller and smaller to support thinner and thinner mirrors not by adding honeycomb cell walls as in the prior art but, instead, by adding additional thin truss members. And, since the back structure is an open-lattice configuration, it can be filled with a removable substance which supports the mirror during polishing operations to prevent quilting.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the polishing method disclosed herein may work well even with honeycomb core back structures.

Other embodiments will occur to those skilled in the art and are within the following claims:

What is claimed is:

1. A method of making a mirror structure, the method comprising the steps of:
    assembling a supporting isogrid framework;
    assembling an isogrid back plane;
    interconnecting the supporting isogrid framework with the isogrid back plane by a truss core;
    disposing an optical surface on the supporting isogrid framework; and
    polishing the optical surface including filling the truss core with a removable substance, grinding the optical surface, and removing the removable substance.

2. The method of claim 1 in which the removable substance includes particles.

3. The method of claim 2 in which the particles are selected from glass, fused silica, sand, and granite material.

4. The method of claim 3 in which the particles are mixed with a binder material.

5. The method of claim 4 in which the binder material is selected from waxes, gypsum, epoxies, and adhesives.

6. The method of claim 1 in which the optical surface is turned upside down, the removable substance is poured into the truss core through the isogrid back plane, and cured.

7. The method of claim 1 in which the removable substance is removed by a technique selected from melting, dissolving, degaussing, and vibration techniques.

8. The method of claim 7 further including the step of figuring the optical surface after the substance is removed.

* * * * *